United States Patent [19]

Dennis

[11] Patent Number: 4,977,762

[45] Date of Patent: Dec. 18, 1990

[54] LOCKING DEVICE FOR A VIDEO CASSETTE RECORDER AND/OR PLAYER

[76] Inventor: Wayne V. Dennis, 18975 Collins Ave. #C110, North Miami, Fla. 33160

[21] Appl. No.: 364,789

[22] Filed: Jun. 9, 1989

[51] Int. Cl.⁵ .............................................. E05B 73/00
[52] U.S. Cl. .......................................... 70/14; 70/58; 70/168
[58] Field of Search ................ 70/14, 57, 58, 166–169

[56] References Cited

U.S. PATENT DOCUMENTS

| | | | |
|---|---|---|---|
| 3,126,728 | 3/1964 | Nehls | 70/169 |
| 4,131,001 | 12/1978 | Gotto | 70/14 |
| 4,527,405 | 7/1985 | Renick et al. | 70/58 X |
| 4,527,407 | 7/1985 | Shanklin | 70/169 X |
| 4,616,490 | 10/1986 | Robbins | 70/168 X |
| 4,640,106 | 2/1987 | Derman | 70/14 |
| 4,655,057 | 4/1987 | Derman | 70/58 X |
| 4,741,185 | 5/1988 | Weinert et al. | 70/14 X |

FOREIGN PATENT DOCUMENTS

| | | | |
|---|---|---|---|
| 8105741 | 7/1983 | Netherlands | 70/57 |
| 2131219 | 6/1984 | United Kingdom | 70/57 |

OTHER PUBLICATIONS

Packaging Advertisement for "Videolok" Anti Theft Device, distributed by AVM Ferrograph Ltd.

Primary Examiner—Lloyd A. Gall
Attorney, Agent, or Firm—Herbert L. Lerner; Laurence A. Greenberg

[57] ABSTRACT

A locking device for a video cassette recorder and/or player having a panel with an opening formed therein in which a video cassette is to be inserted and a movable cover closing the opening includes a lock restricted to operation by authorized personnel from outside the video cassette recorder for selectively permitting and preventing movement of the cover.

9 Claims, 3 Drawing Sheets

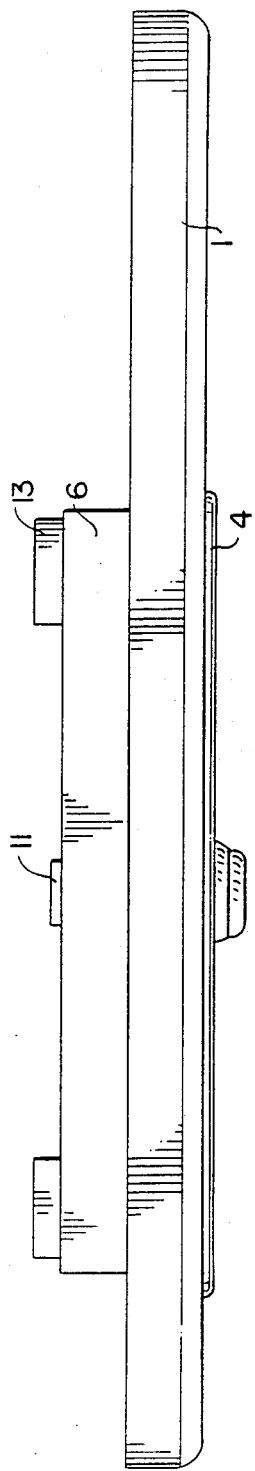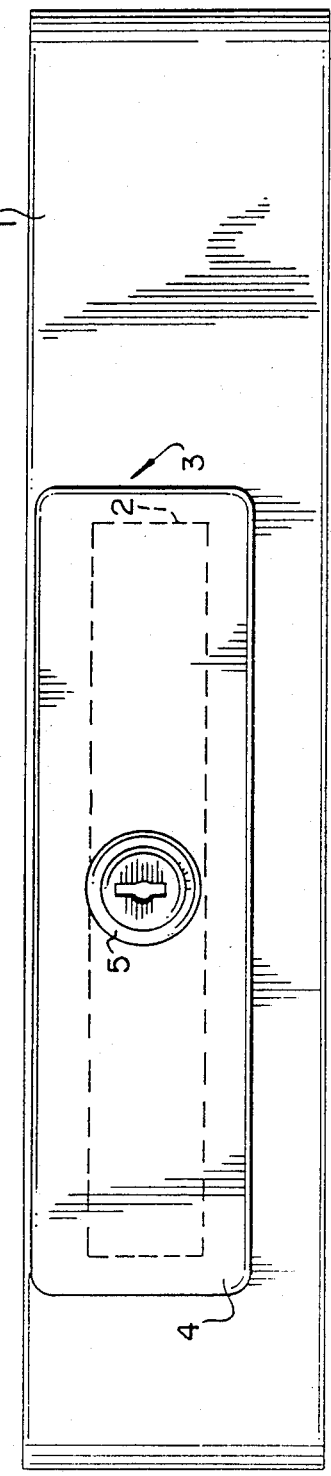

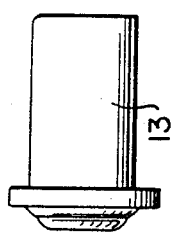
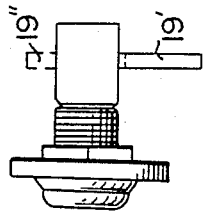
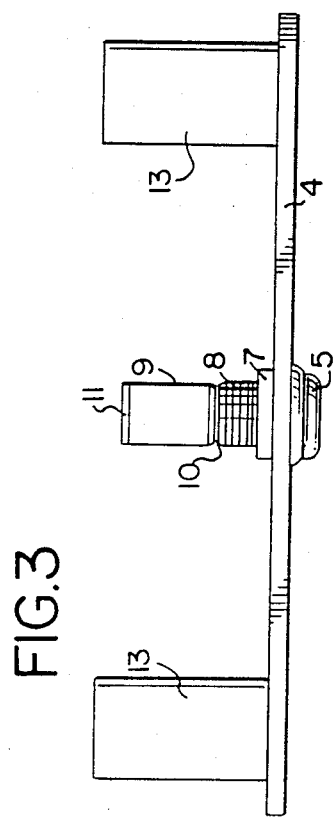
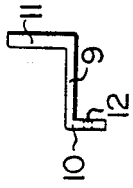
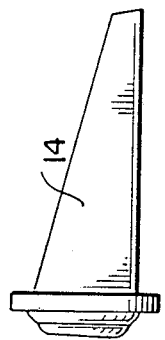

LOCKING DEVICE FOR A VIDEO CASSETTE RECORDER AND/OR PLAYER

BACKGROUND OF THE INVENTION

1. Field of the Invention

The invention relates to a locking device for a video cassette recorder and/or player having a panel with an opening formed therein in which a video cassette is to be inserted and a movable cover closing the opening.

2. Description of the Related Art

In recent years with the proliferation of video and cable equipment, it has become desirable to restrict the usage of such equipment to authorized individuals. Cable television companies offer locks which prevent the viewer from watching certain channels. However, it has not been possible to prevent the use of video cassette recorders and/or players.

Accordingly, children may play video cassettes at home and others may use video equipment in businesses with restrictions.

Additionally, the cover which closes the opening through which a cassette is inserted is rather large, and children can easily place their fingers into the opening. This may lead to injury to the children and to damage to the video cassette recorder, especially if foreign objects are inserted.

SUMMARY OF THE INVENTION

It is accordingly an object of the invention to provide a locking device for a video cassette recorder, which overcomes the hereinafore-mentioned disadvantages of the heretofore known video cassette recorders which cannot be locked.

With the foregoing and other objects in view there is provided, in accordance with the invention, a locking device for a video cassette recorder having a panel with an opening formed therein in which a video cassette is to be inserted and a movable cover closing the opening, comprising a lock restricted to operation by authorized personnel from outside the video cassette recorder for selectively permitting and preventing movement of the cover.

Through the use of the invention as disclosed above, it is possible to prevent unauthorized personnel or children from operating or gaining access to the interior of the video cassette recorder.

In accordance with another feature of the invention, there is provided a plate covering the opening, the lock being mounted on the plate. In accordance with a further feature of the invention, the plate has substantially the same dimensions as the opening. The plate covers the opening and prevents unauthorized personnel or children from tampering with the lock.

In accordance with an added feature of the invention, there are provided means integral with the plate for at least partially filling the opening and pushing the cover open as the plate approaches the opening. In accordance with an additional feature of the invention, the filling and pushing means are in the form of at least one block. The block makes it even harder to reach the part of the lock behind the plate which engages the cover. The shape of the block generally resembles the profile of a cassette. In accordance with yet another feature of the invention, the at least one block has a sloping upper surface for gradually opening the cover during insertion into the opening. The use of a sloping surface is advantageous if it is desired to open the cover slowly.

In accordance with yet a further feature of the invention, the lock has engagement means movable between a position engaging the cover and preventing the locking device from being removed from the opening and a position disengaging the cover and permitting the locking device to be removed from the opening. In accordance with yet an added feature of the invention, the plate has an inner surface facing toward and an outer surface facing away from the video cassette recorder, the lock being accessible from the outer surface and the engagement means being disposed at the inner surface. In accordance with yet an additional feature of the invention, the engagement means are in the form of an L-shaped bar having a leg for engaging the cover. If it is attempted to remove the locking device without opening the lock, such engagement means actually grasp the cover more securely as a greater attempt is made to pull the locking device out of the opening.

With the objects of the invention in view, there is also provided a locking device wherein the lock is disposed in the panel of the video cassette recorder, such as alongside the opening. In this way, the video cassette recorder may be equipped with a locking device during manufacture thereof.

In accordance with another feature of the invention, the lock has engagement means movable into and out of a given position in which the cover is prevented from being moved into the opening. In accordance with a further feature of the invention, the engagement means are disposed behind the cover in the given position. In accordance with an added feature of the invention, the engagement means are in the form of a reciprocating rod. Although a rotating cam can also be used if space permits, it is believed that a reciprocating rod will most easily be adaptable to existing recorders without requiring other modifications to be made.

In accordance with a concomitant feature of the invention, the lock is a key lock. However, a combination lock with a dial or a push button or even a key card could be used.

Other features which are considered as characteristic for the invention are set forth in the appended claims.

Although the invention is illustrated and described herein as embodied in a locking device for a video cassette recorder, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

FIG. 1 is a diagrammatic, front-elevational view of a video cassette recorder in which a locking device according to a first embodiment of the invention has been inserted;

FIG. 2 is a top-plan view of the front panel of the video cassette recorder and locking device according to FIG. 1;

FIG. 3 is a top-plan view of the locking device according to FIG. 1 alone;

FIG. 4a is a side-elevational view of the device of FIG. 3;

FIG. 4b is a view similar to FIG. 4a with differently shaped arms;

FIG. 5 is a side-elevational view of a cam of the locking device of FIG. 3;

FIG. 7 is a fragmentary, top-plan view of the lock of the locking device of FIG. 6.

DESCRIPTION OF THE PREFERRED EMBODIMENTS

Figure 6:
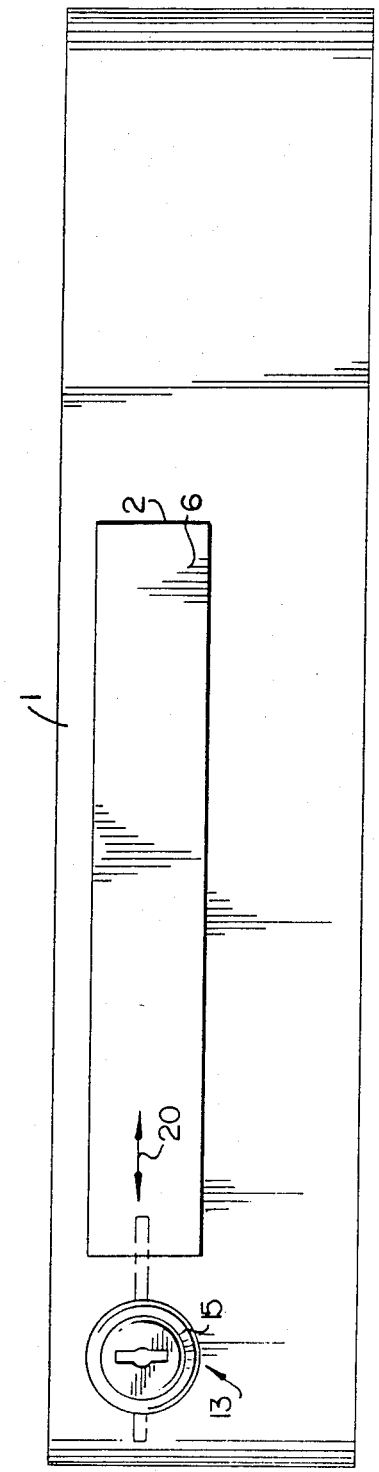
FIG. 6 is a front-elevational view of a video cassette recorder in which a locking device according to a second embodiment of the invention has been installed.

Referring now to the figures of the drawing in detail and first, particularly, to FIG. 1 thereof, there is seen a front panel 1 of a video cassette recorder having an opening 2 in which a video cassette is to be inserted. A locking device 3 according to the invention has been inserted in the opening 2 instead of a video cassette. The locking device has a front plate 4 and a lock 5 disposed therein.

As shown in FIG. 6, the panel 1 has a cover 6 which is disposed behind the opening 2. The cover 6 is somewhat larger than the opening 2 and is suspended from spring-loaded hinges which keep the cover normally biased against the inside of the front panel 1, so as to cover the opening 2. The cover swings upward when a video cassette is inserted into the opening.

FIG. 2 shows that the cover 6 is swung upward by the locking device 3 when it is inserted. The locking device is seen more clearly in FIG. 3 which indicates that the lock 5 has a barrel 8 with screw threads on which a nut is screwed so as to firmly attach the lock to the front plate 4. As seen in FIGS. 3 and 5, engagement means in the form of an L-shaped bar or cam 9 have a shorter leg 10 with an opening 12 formed therein and a longer leg 11. The cam is attached to the lock 5 with a non-illustrated screw which passes through the opening 12. When a key is inserted into the lock 5 and turned, the cam 9 rotates and the longer leg 11 can be pivoted upward. If the locking device 3 is inserted into the opening 2 with the longer leg 11 of the cam facing upward, the longer leg 11 becomes engaged behind the edge of the cover 6, as shown in FIG. 2. In this way, it is impossible to remove the locking device without inserting the key and turning the cam. The harder one pulls on the locking device without turning a key, the tighter the leg 11 is wedged against the cover. The cam can be provided in different lengths so as to accommodate covers of different lengths.

The locking device also has arms or blocks 13 shown in FIGS. 3 and 4a which push the cover open as the locking device is inserted into the opening 2. The arms also fill up the opening so as to prevent the plate 4 from being pried open or pushed aside. FIG. 4b shows that arms 14 with a gradually sloping or inclined upper surface may be used as well. The arms 14 must be wider than the arms 13 as seen in the direction perpendicular to the plane of the paper in FIG. 4b, thus leaving less open space between each of the arms and the cam 9 so as to prevent the inclined upper surface of the arms 14 from allowing the plate 4 to be pried open and pushed aside. The arms of either shape may be integral with the plate or they may be attached thereto.

In the embodiment of FIG. 6, a locking device 13 having a lock 15 is used. The lock 15 is inserted into the front panel 1 of the video cassette recorder alongside the opening 2, although it is possible to place the lock above or below the opening as well. As best seen in FIG. 7, the lock 15 has engagement means in the form of a cam or reciprocating rod which can move between a locking position 19' in which it extends behind the cover 6 and a retracted position 19" in which it allows the cover to be swung open. The position of the cam is changed by inserting and turning a key in the lock 15, which slides the cam in the direction of an arrow 20. The sliding of the cam behind the cover prevents the cover from opening.

Naturally, it is possible to use a combination lock with a dial or pushbuttons instead of a key lock in both embodiments.

I claim:

1. Locking device for video cassette recorders and players having a panel with an opening formed therein in which a video cassette is to be inserted and a movable cover closing the opening, comprising a lock insertable into the opening operable from outside the panel, and engagement means movable by said lock between a position engaging an edge of the cover and preventing the locking device from being removed from the opening and a position disengaging the edge of the cover and permitting the locking device to be removed from the opening.

2. Locking device according to claim 1, including a plate covering the opening, said lock being mounted on said plate.

3. Locking device according to claim 2, including means integral with said plate for at least partially filling the opening and pushing the cover open as said plate approaches the opening.

4. Locking device according to claim 3, wherein the plate has an inner surface facing toward and an outer surface facing away from the video cassette recorder, said lock being accessible from said outer surface and said engagement means being disposed at said inner surface.

5. Locking device according to claim 1, wherein said engagement means grasps the cover in said position preventing the cover from moving.

6. Locking device according to claim 5, wherein said engagement means are in the form of an L-shaped bar having a leg for engaging the cover.

7. Locking device according to claim 6, wherein said lock is a key lock.

8. Locking device according to claim 1, wherein said lock is a key lock.

9. Locking device for video cassette recorders and players having a panel with an opening formed therein in which a video cassette is to be inserted and a movable cover closing the opening, comprising a plate covering the opening, a lock being mounted on said plate and being operable from outside the panel, engagement means movable by said lock between a position engaging the cover and preventing the locking device from being removed from the opening and a position disengaging the cover and permitting the locking device to be removed from the opening, and means in the form of at least one block integral with said plate for at least partially filling the opening and pushing the cover open as said plate approaches the opening, said at least one block having a sloping upper surface for gradually opening the cover throughout insertion into the opening.

* * * * *